United States Patent [19]

Raley

[11] 4,155,693

[45] May 22, 1979

[54] EMBOSSED SCREEN ASSEMBLY

[75] Inventor: Garland E. Raley, Terre Haute, Ind.

[73] Assignee: Ethyl Corporation, Richmond, Va.

[21] Appl. No.: 927,108

[22] Filed: Jul. 24, 1978

[51] Int. Cl.² ............................................. A01J 21/00
[52] U.S. Cl. .................................... 425/363; 264/504;
264/555; 425/290; 425/328; 425/388
[58] Field of Search .............. 425/363, 290, 328, 388,
425/403, 407; 128/287; 264/92, 90

[56] References Cited

U.S. PATENT DOCUMENTS

| 3,054,148 | 9/1962 | Zimmerli | 264/92 |
| 3,546,742 | 12/1970 | Kugler | 425/290 |
| 3,708,647 | 1/1973 | Barnhart | 425/363 |
| 3,814,101 | 6/1974 | Kozak | 128/287 |
| 4,116,594 | 9/1978 | Leanna et al. | 425/363 |

*Primary Examiner*—William E. Schulz
*Attorney, Agent, or Firm*—Donald L. Johnson; John F. Sieberth; David L. Ray

[57] ABSTRACT

A rotatable perforated molding element for embossing and/or perforating thermoplastic sheet or film, the molding element including a series of perforated strips having two parallel sides and two parallel ends, the sides being perpendicular to the ends, each of the strips being welded at the end prior to placing the strips on a supporting drum. Additional strips are placed on the drum until the desired area of the drum is covered with the strips.

11 Claims, 4 Drawing Figures

EMBOSSED SCREEN ASSEMBLY

BACKGROUND OF THE INVENTION

The present invention relates to thermoplastic sheet and film products. More particularly, the invention relates to a rotatable perforated molding element or screen for use in the preparation of embossed and/or perforated thermoplastic sheet or film and a method for connecting the molding element to the supporting roll or drum.

Perforated and embossed thermoplastic sheet or film have many useful applications. Perforated film is used in gardening and farming to prevent the growth of grass and other weeds while permitting more moisture to be transmitted through the film to the soil beneath. Perforated film is also used for making disposable baby diapers. U.S. Pat. No. 3,814,101 discloses diapers employing perforated thermoplastic film which permits the flow of liquid in the direction of the absorbent material in the diaper but substantially reduces the possibility of flow in the opposite direction. Embossed film without perforations are also used in making baby diapers, and in other applications where it is important that the film have a cloth-like appearance or feel.

One of the methods for perforating thermoplastic sheet or film is disclosed in U.S. Pat. No. 3,054,148, issued to Zimmerli, which is hereby incorporated by reference. The Zimmerli patent discloses a stationary drum having a molding element mounted around the outer surface of the drum and being adapted to rotate freely thereon. A vacuum chamber is employed beneath the screen or molding element to create a pressure differential between the respective surfaces of the thermoplastic sheet to cause the plasticized sheet to flow into the perforations provided in the molding element and thereby cause a series of holes to be formed in the sheet.

Difficulties are frequently encountered when placing the molding element or screen onto the drum, particularly in achieving a snug fit about the drum and replacing a torn or broken screen rapidly. When the perforations in the molding element or screen are very fine, it is necessary to connect the screen to the drum by using a laser to weld the edges of the screen together after the screen is wrapped about the drum. However, such welding in general cannot be done in the field. Furthermore, the welds are commonly deficient in strength when they must be made while the screen is wrapped about the drum.

Difficulty is also commonly encountered in forming a one-piece screen which will have the exact dimensions desired. It is commonly the practice to cut a series of strips from a screen and weld panels of the screen together to form one large rectangular screen which can be wrapped about the drum and welded along one seam to achieve a fit upon the drum. However, welding a series of strips together is time consuming and expensive. It is also extremely difficult to get a snug fit of the screen to the outside of the drum. Furthermore, the screen tends to loosen on the drum with use.

THE INVENTION

In accordance with the present invention, there is provided a rotatable perforated molding element for embossing and/or perforating thermoplastic sheet or film which can be quickly and easily placed in position on or removed from a support roll or drum, the molding element including a series of perforated strips having two parallel sides and two parallel ends, the sides being perpendicular to the ends and the ends being welded together, and a method for connecting rotatable perforated molding elements to a support drum including welding together the ends of perforated strips having two parallel sides and two parallel ends, sliding the strips over the ends of the support drum until the parallel sides of the strips contact with each other and providing retaining rings at the sides of each end of the series of strips to prevent the strips from sliding off of the support drum.

DESCRIPTION OF THE PREFERRED EMBODIMENTS

Figure 1:
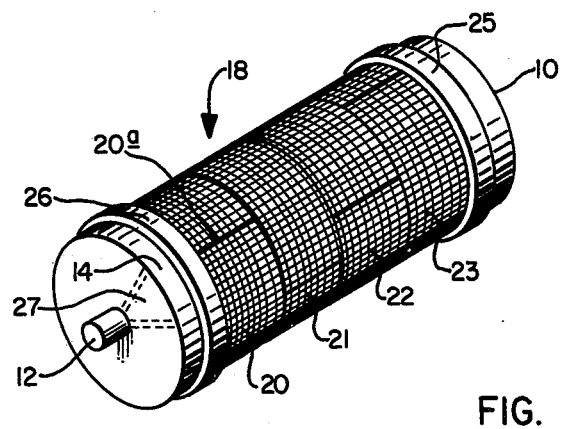
FIG. 1 is a perspective view of a perforating drum having a molding element or screen wrapped therearound.
Figure 3:
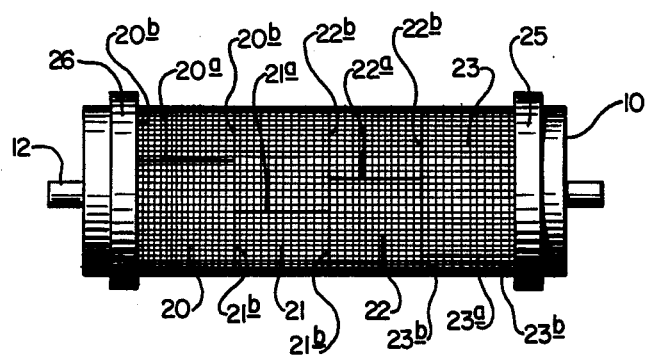
FIG. 3 is a front plan view of the drum of FIG. 1.

Referring now to FIG. 1, a cylindrical roll or drum 10 is shown disposed about an axle 12. The rotatable molding element of the invention is generally indicated by the numeral 18 and is shown in FIGS. 1 and 3 to be wrapped about drum 10. Axle 12 defines the axis about which molding element 18 rotates.

Molding element 18 is composed of a series of strips, which for purposes of illustration have been numbered 20, 21, 22, and 23. The strips are substantially identical in size and shape. The numbers 20 thru 23 have been used to identify four of the strips although as many strips may be used as desired and as are necessary to cover the drum given the dimensions of the strip and dimensions of the drum.

The strips 20 thru 23 have parallel ends which are welded together at 20a thru 23a as seen in FIGS. 1 and 3. The seams 20a thru 23a can be seen to be perpendicular to the sides 20b thru 23b of the strips and extend across the full width of the strips.

The diameter of the strips may be chosen so that they may be easily slipped over the drum 10 when one of the retaining rings 25 or 26 is removed. The diameters of the individual sections of strips may also be chosen so that the strips fit tightly on the drum or fit loosely.

The strips 20 thru 23 may have varying widths or they may all be of the same width. The seams 20a thru 23a are parallel to the axis of rotation of drum 10 which is the center line of axle 12. The sides 20b thru 23b are perpendicular to the axis of rotation of the drum. The sides of adjacent strips are not connected, and each of the strips may rotate relative to adjacent strips if sufficient twisting force or torque is exerted on the screen.

The strips are held on drum 10 by retaining rings 25 and 26. Retaining rings 25 and 26 are preferably metal rings which were originally connected to supporting drum 10 by any conventional means such as screwing, welding, bolting, or the like. However, if desired, retaining rings 25 and 26 may be constructed from other materials such as hard plastics, rubber, or the like.

Figure 2:
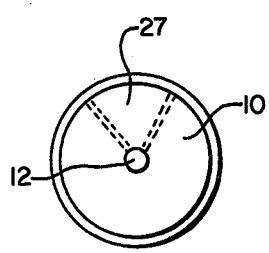
FIG. 2 is an end view of the drum of FIG. 1.

In FIGS. 1 and 2, a vacuum chamber is schematically represented by the area 27 between the dotted lines at the end of drum 10 and the surface 14 of the drum 10. Vacuum chamber 27 can be any conventional vacuum chamber well-known in the art. Vacuum chamber 27 is similar to that disclosed in the previously mentioned Zimmerli patent although in the particular embodiment shown in the present invention, drum 10 rotates about axle 12 and molding element 18 rotates therewith. The area defined by vacuum chamber 27 remains stationary within the drum.

Figure 4:
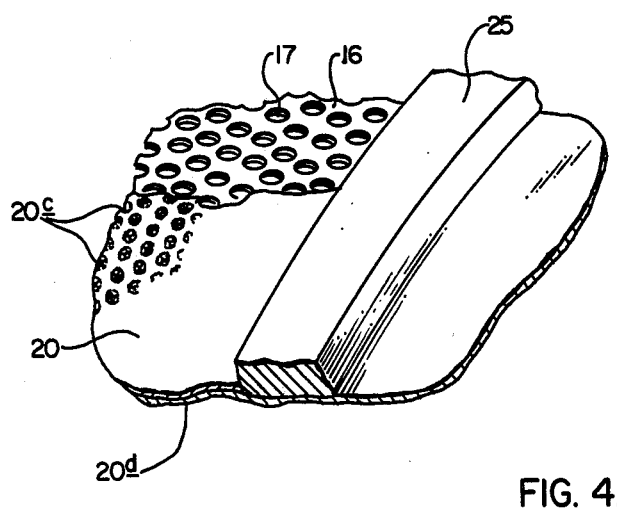
FIG. 4 is a cut-away, enlarged view of a portion of the screen of FIGS. 1 and 3.

In FIG. 4, the outer surface 16 of drum 10 which lies between rings 25 and 26 and beneath strips 20 thru 23 can be seen to have perforations 17 therein for permitting a vacuum to be applied to strip 20. Strip 20 has edge 20d shown in FIG. 4 and perforations 20c therein which form holes or embossing depressions in the thermoplastic sheet or film when a vacuum is applied thereto. The strips may be perforated in any desired pattern or design. Strip 20 is typical of all the other strips. If desired, the outer sruface of drum 10 and the area of the vacuum chamber 27 could be removed in the manner described in the Zimmerli patent whereby the drum remains stationary. Thus, the area 16 of the outer surface of drum 10 would be eliminated along with the perforations 17 therein.

Any thermoplastic material which may be formed into flexible film or sheets may be used in the production of the novel products of the present invention. Exemplary thermoplastic materials include cellulose esters, e.g., cellulose acetate, cellulose propionate, cellulose butyrate; mixed esters of cellulose; cellulose ethers, e.g., ethyl cellulose; nylon and polymeric materials, e.g., polyvinyl alcohol acetals, polyvinyl chloride, polyvinyl chloride acetate, polystyral, methyl methacrylate, polyethylene, polypropylene, and other polyolefins which may be formed into flexible film or sheet, and the like. Sheets or film made from such materials may be plasticized with suitable plasticizers and other additives known in the art may be added to achieve the desired physical characteristics.

The perforated molding strips 20 may be made of metal or any other suitable material. They may be made from a metal sheet having the perforated design stamped or otherwise cut from the sheet. Furthermore, perforation of the strips may be provided by etching a plate to make holes therein.

Having fully described the present invention, it is desired that it be limited only within the spirit and scope of the attached claims:

What is claimed:

1. A rotatable perforated molding element means for embossing and/or perforating thermoplastic sheet or film comprising a plurality of perforated strip means, each of said strip means having two parallel sides and two parallel ends, said sides being perpendicular to said ends, said strip means being joined at said ends, said strip means being adapted for sliding onto a drum means for supporting said strips in a manner such that said sides of said strip means lie in a plane generally perpendicular to the axis of rotation of said molding element means and said sides of adjacent strip means contact each other.

2. The molding element means of claim 1 wherein said strip means are contained on said drum means by ring means.

3. The molding element means of claim 1 wherein said strip means are held on said drum means between first ring means and second ring means.

4. The molding element of claim 3 wherein said first and second ring means comprise metal cylindrical rings which are rigidly affixed to said drum means.

5. The molding element means of claim 1 wherein said molding element means is adapted for rotation about said drum means.

6. The molding element means of claim 1 wherein said molding element means is adapted for rotating with said drum means.

7. The molding element means of claim 1 wherein said ends are joined by welding.

8. A method for connecting a rotatable perforated molding element means for embossing and/or perforating thermoplastic sheet or film to drum means for supporting said molding element means, comprising:
   a. forming a series of perforated strip means having two parallel sides and two parallel ends, said sides being perpendicular to said ends;
   b. welding the ends of said strips together;
   c. placing said strip means on said drum means so that the sides of said strips are perpendicular to the axis of rotation of the drum means; and,
   d. placing ring means on said drum means to prevent said strip means from sliding off of said drum.

9. A rotatable assembly for embossing and/or perforating thermoplastic sheet or film comprising drum means and a rotatable perforated molding element means wrapped about said drum means, said molding element means comprising a plurality of strip means, each of said strip means having two parallel sides and two parallel ends, said sides being perpendicular to said ends, said strip means being joined at said ends, said strip means being arranged on said drum means so that said side means are parallel to the axis of rotation of said rotatable molding element means.

10. The apparatus of claim 9 wherein said drum means has means therein to subject the surface of said strip means to a fluid pressure differential.

11. The apparatus of claim 9 wherein said drum means has ring means thereon for containing said strip means therebetween to prevent said strip means from sliding off of the ends of said drum means.

* * * * *

UNITED STATES PATENT AND TRADEMARK OFFICE
CERTIFICATE OF CORRECTION

PATENT NO. : 4,155,693
DATED : May 22, 1979
INVENTOR(S) : Garland E. Raley

It is certified that error appears in the above—identified patent and that said Letters Patent is hereby corrected as shown below:

In Claim 9, Column 4, line 45, the phrase "said side means are parallel", should read "said sides are perpendicular".

Signed and Sealed this

Twenty-third Day of February 1982

[SEAL]

Attest:

GERALD J. MOSSINGHOFF

Attesting Officer     Commissioner of Patents and Trademarks